Sept. 15, 1959 P. W. RABER 2,904,094
TRACTION DEVICE
Filed Nov. 7, 1956 2 Sheets-Sheet 1

INVENTOR.
Peter Raber
BY Horton, Davis
Brewer & Brugman
Attys.

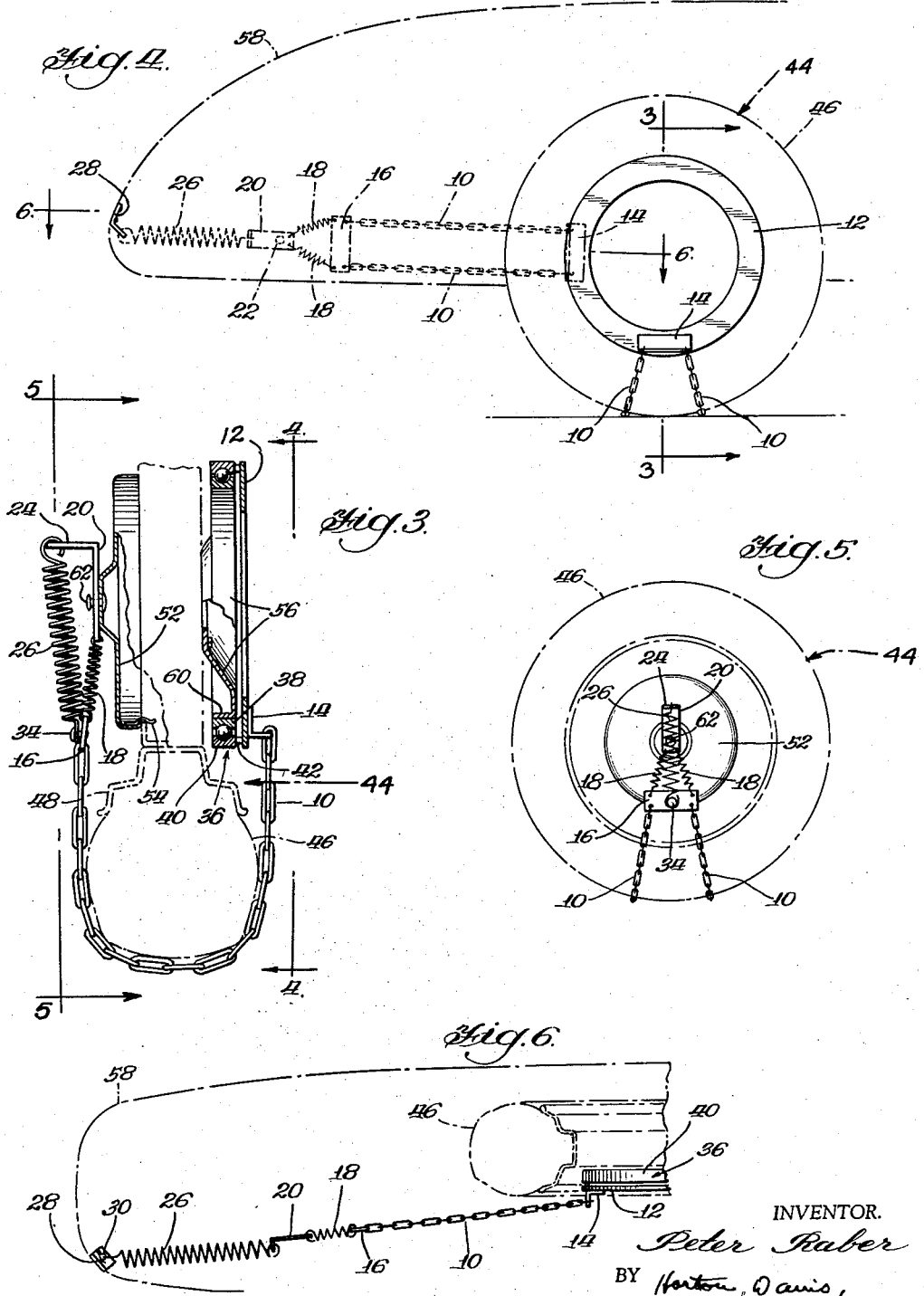

United States Patent Office 2,904,094
Patented Sept. 15, 1959

2,904,094

TRACTION DEVICE

Peter W. Raber, Chicago, Ill.

Application November 7, 1956, Serial No. 620,786

9 Claims. (Cl. 152—216)

The present invention relates to a traction device for automobiles.

It will be appreciated that ordinary traction provided by the traction wheels of an automobile is not effective in all situations, such, for example, as in loose snow, on ice, etc. In such a situation it becomes necessary to be towed, or to provide extra traction for the wheels, such as by applying conventional chains on the wheels, depositing sand before the wheels, or other traction means such as a screen, etc. However, such facilities may not be readily accessible when needed.

The invention takes into consideration a prime difficulty in connection with traction devices for automobiles. It is desired, of course, that the traction device not be on the wheel constantly, as, for example, a set of chains that when in place encircle the wheels. Such chains are inconvenient to put on and remove, and when the automobile is on dry pavement they are noisy and would wear out rapidly. A more desirable traction device is one that can be quickly and easily applied and removed. It is further desired that the device be permanently mounted on and carried by the automobile so that it is always immediately accessible. Mounting of the device on the automobile, however, presents a considerable problem in that mounting it on a fixed portion of the body of the automobile would work against its rotating with the wheel as is necessary in order that the wheel be provided with the desired added traction, while mounting it on the wheel would work against mounting it on a fixed portion of the automobile, as is desired when putting it in an inoperative position.

I have solved the above problem in a novel and extremely simple construction, and it is therefore an object of the invention to provide such construction, wherein a traction device is permanently mounted at one end on a relatively rotatable element, and detachably mounted at the other end on a stationary portion of the automobile, in an arrangement in which relative movement is provided between the traction device and part of the automobile on which it is mounted, when the traction device is in an operative position, and moves bodily with the wheel when it is mounted thereon in that position.

An important object of the invention is to provide a traction device that is of extremely simple construction.

Another object is to provide a traction device that can be put in operative position on the wheel and removed therefrom very easily and quickly.

Another object is to provide a traction device of the foregoing general character that can be adapted to a standard wheel with a minimum of alteration of the wheel.

Still another object is to provide a traction device of such simple construction that it may be mounted on the automobile in an inoperative position in which it is out of sight to an ordinary observer and is otherwise of such inconspicuous nature that it can conveniently be left on the automobile both in and out of season.

Another object is to provide a traction device for an automobile that is snugly held to the traction wheel when in operative position by a resilient means, and which is such that the wheel can rotate rapidly or spin without the device flying out from the wheel so as to catch or snag on any part of the automobile.

Other objects and advantages of the invention will appear from the following detail description taken in conjunction with the accompanying drawings in which:

Fig. 3 is a vertical cross sectional view of a wheel with the device applied thereto, and taken on line 3—3 of Fig. 4;

Fig. 4 is a view from the inside of the wheel, taken on line 4—4 of Fig. 3 with the device applied, and showing in phantom view the automobile fender and the device mounted in inoperative position;

Fig. 5 is a view from the outside of the wheel with the device applied thereto and taken on line 5—5 of Fig. 3;

Fig. 6 is a horizontal view of the wheel, taken on line 6—6 of Fig. 4, with the traction device mounted in inoperative position.

Figure 1:
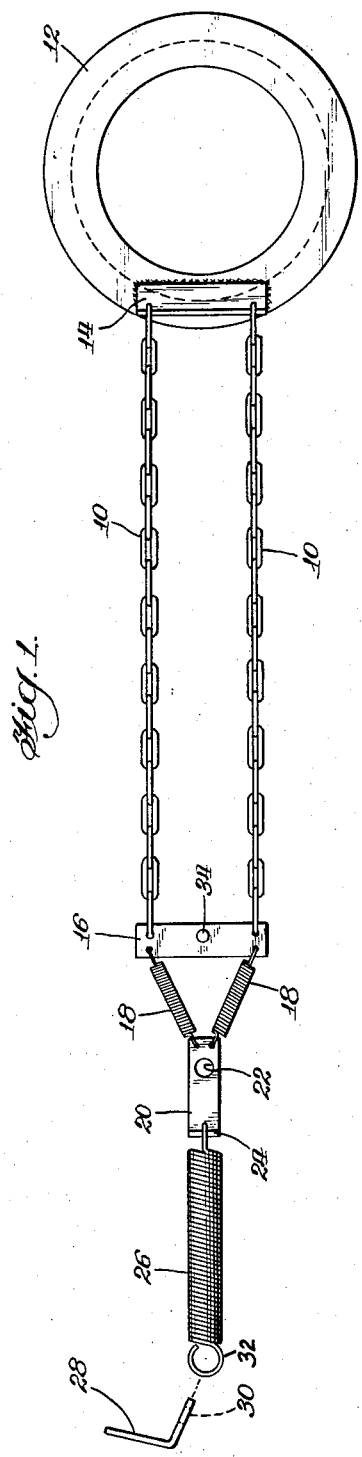
Figure 1 is a side view of the traction device including those elements applied to an otherwise standard wheel construction.
Figure 2:
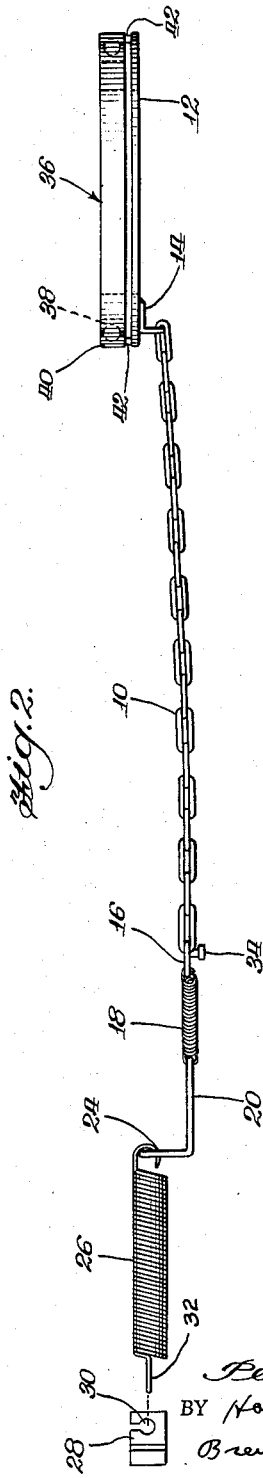
Fig. 2 is a view from the edge of Fig. 1.
Figure 7:
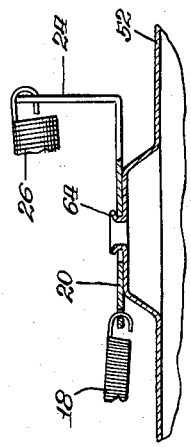
Fig. 7 is a detail cross sectional view of a modified form of mounting element on the wheel hub cap.

Referring in detail to the drawings, the novel traction device of the invention is shown in its entirety in Figs. 1 and 2, from which it will be seen that it is of extremely simple construction. In applying the device to the automobile, it is necessary that it be mounted directly on the wheel when it is in operative position in order to provide the desired traction effect, but it is just as necessary that when it is in inoperative position it be free of the wheel so as not to impede the motion of the wheel. It is desirable also that when it is in inoperative position, it be in an out-of-the-way position and be inconspicuous. The present device can be applied to the automobile, taking into account the above considerations, with a minimum of alteration to the automobile. The traction device, as seen in Figs. 1 and 2, includes a pair of chains 10 of suitable and conventional character. These chains constitute the traction elements that directly engage the wheel and the ground for providing the desired traction effect and are of sufficient strength for that purpose, being preferably steel chains.

The chains 10 are secured at one end to a ring or annulus 12 which is mounted on a brake plate, or other stationary part of the rear housing, as described in detail below. The means for so mounting the chains on the ring may be an angle piece 14 suitably secured to the ring as by welding, riveting, etc., and having holes receiving hooks on the chains, or the end links themselves. The connections between the links and angle piece preferably are spaced apart to accordingly space the chains when fitted on the wheel in operative position.

The chains at the opposite end are secured to a cross piece 16 having holes for receiving connecting elements on the chains and preferably spaced apart similar to the spacing of the chains at the angle piece 14. Also connected to the cross piece 16 is a pair of tension springs 18 extending longitudinally oppositely from the chains and connected to a hook element 20 which is preferably a steel piece having a hooking aperture 22 and a turned-over end extension 24. Secured to the extension 24 is a tension spring 26. A bracket 28 is provided having means for connecting the free end of the spring 26 thereon when the traction device is mounted in inoperative position, the bracket being mounted on the automobile bumper, as explained below. This means may be a hook 30 on the bracket and an eyelet 32 on the spring (Figs. 1 and 2). The eyelet on the spring is also utilized for hooking over a projection 34 on the cross piece 16 when the device is in operative position, as explained hereinbelow. The projection 34 may be of suitable form, e.g., a bolt having a head to prevent the eyelet from accidentally slipping off.

A final element in the traction device proper is a ball bearing assembly 36 of conventional form and including an inner ring or race 38 and an outer ring or race 40. The bearing assembly is secured on a stationary part concentric with the wheel axis, as described fully hereinbelow and to the ring or annulus 12 and serves as the means of mounting the device on the wheel. The bearing assembly may be mounted on the ring 12 by suitable means such as by welding, bolting, etc., as indicated at 42.

Portions of the automobile on which the traction device is mounted are shown in Figs. 3–7 and include standard or conventional elements with the device adapted thereto. A rear or traction wheel 44 includes a tire 46 mounted on a rim 48, and a disc-like central portion or body 50 on which the rim is mounted. A hub cap 52 is detachably mounted on the outer side of the wheel by means of spring detents 54 releasably engaging an element on the wheel. On the inner side of the wheel is a brake plate 56, also a conventional part. The plate 56 is the usual brake dust plate. The usual fender covering the wheel is indicated at 58.

The plate 56 is utilized for mounting one end of the traction device. This plate is a stationary element and has a marginal flange 60 to which the bearing assembly 36 is secured. The inner ring or race 38 of the bearing assembly is dimensioned to engage and closely fit the flange and is welded thereto at spaced points therearound. The outer race 40 of the bearing assembly is, of course, able to rotate relative to the inner race, and since the ring or annulus 12 is secured to the outer race, it is arranged for rotation relative to the plate 56, being held stationary while the device is mounted in inoperative position, but it does, however, rotate with the wheel when the traction device is mounted in operative position.

Considering first, for convenience, the inoperative position of the device, attention is directed to Figs. 4 and 6. In the dot-dash line position of Fig. 4 and in the position shown in Fig. 6, it will be seen that the traction device is anchored or supported at one end on the plate 56, or more specifically on the ring 12, and at the other end on the bracket 28 which is preferably mounted on the bumper so as to provide easy access thereto. For convenience, the spring 26 can be extended through an opening in the fender for this purpose. The bracket is so mounted by any convenient means such as by welding or riveting, and is located laterally at such a position, as indicated in Fig. 6, as to assure that the chains clear the tire for free running of the tire without hindrance from the chains. The springs 18 and the spring 26 constitute lineal segments of the device and are so dimensioned relative to the remaining elements of the device, and to the adjacent portions of the automobile, as to be in tension when the spring 26 is hooked on the bracket 28, and the whole device is held taut and against undue vibration, rattling, etc., that its presence would be undetected by ordinary observation. The ball bearing assembly 36 provides the necessary free relative rotation between the ring 12 and the plate 56 when the traction elements are applied to the wheel.

Assume next a condition where it is desired to have additional traction, as in snow. The driver unhooks the element 20 from the bracket 28 and draws the device around the wheel, bringing the chains into tight engagement with the tire and particularly the tread surface thereof, and hooks the element 20 onto the wheel on the outside. This is provided by the projection 62 which in one form of the invention may be a button fitted in the hub cap 52 in a suitable and well-known manner. The linear dimension of the device is such that the springs 18 are in tension and adequately retain the device as a whole snug on the wheel. The spring 26, utilized in mounting the device on the bumper in its inoperative position, is now hooked onto the projection 34 to restrain it against flying out due to centrifugal force in rotation of the wheel. The turned-over extension 24 to which the spring is attached serves to space the spring from the hub cap when the spring is so hooked back so as to prevent rattling thereof.

The device is held snugly to the tire and great friction is established therebetween so that the chains form effective projections on the tire for gripping the ground, as in the snow, for providing extra traction and eliminating spinning of the wheels. One such device is applied to each rear or traction wheel of the automobile, so as to prevent spinning of either.

The ring 12, while providing free rotation between the traction device and brake plate because of the bearing assembly 36, when the device is in operative position, remains stationary when the device is in inoperative position. The friction between the chains and tire is so great that there is no slipping therebetween and the traction device and the wheel constitute a unit and rotate together as such. The wheel is enabled to rotate rapidly, and even spin, without the chains whipping out and catching on the fender or any other part of the car, being restrained by the springs 18. Rapid rotation of the wheels results in rapid repeated engagement of the chains with the ground, and progressive creeping of the automobile out of the spot where traction is difficult to attain. After the automobile has pulled out of such spot, the driver can easily unhook the piece 20 from the hub cap and unhook the end of the spring 26 from the projection 34 and hook the latter on the bracket 28. The device is then entirely clear of the wheel so that the latter is free to rotate without hindrance. The device is then entirely out of sight to an observer in a normal position. The automobile need not be stopped with the traction device in a particular location in order to unhook it from the wheel and put it in inoperative position. Even if it should be positioned at the front when the automobile is stopped, the ring 12 can readily be rotated for bringing the remainder of the device to the rear for hooking it up in inoperative position.

The novel traction device of the invention is of utmost simplicity, both in the manufacture of the device and in attaching it to the automobile. Given the traction device itself, in order to apply it to the automobile it is only necessary to secure the bearing assembly 36 to the plate 56, secure the bracket 28 to the bumper, and secure the button 62 to the hub cap. The construction lends itself to incorporation in an automobile in the original manufacture thereof, and it is further intended to be within the scope of the invention that, if it should be so desired, the plate 56 be provided with and secured to the traction device proper, and such assembly then supplied as a unit to the user.

It will be observed that the ring 12 is of sufficiently small diameter that the outer margin thereof is spaced a substantial distance radially inwardly from the rim 48 so as not to interfere with placing a tire on the rim or removing it therefrom, or to interfere with a tire that should go flat.

An important advantage of the invention resides in the fact that the ring 12 and bearing assembly 36 remain stationary in normal conditions when the device is mounted in inoperative position. It is only when the device is mounted on the wheel in operative position that any relative movement takes place, but this is only a small part of the time, and actually only a matter of minutes at any one time, so that there is a minimum of movement between the parts. When it is mounted in inoperative position, no relative movement takes place and it remains in a condition as if it were a portion of the fixed and stationary part of the body of the car.

It will be understood that the ring 12 can be mounted on any other convenient stationary part of the brake housing or similar element.

A great advantage of the invention resides in the substantial elimination of jamming of the traction device by snow, slush, and ice, as may result in the case of complicated structures. The simplicity of the structure works to this advantage. The ring 12 actually is a cover plate, covering the bearing assembly 36 and substantially preventing the entrance of foreign materials thereinto.

In the interest of simplicity and economy in manufacture, it is contemplated that instead of utilizing a button separate from and secured in the hub cap, for hooking the piece 20 thereon, the hub cap be pierced or punched to form an out-turned bead 64 integral with the body of the hub cap. This bead thus has an inner portion or stem of smaller diameter and an outer portion or head of greater diameter to prevent slipping off of the piece 20.

While I have shown herein a preferred embodiment of the invention, it will be understood that changes may be made within the scope of the appended claims.

I claim:

1. A traction device comprising traction elements for frictionally bearing on the tread surface of a traction wheel of an automobile, means securing one end of the traction elements to a stationary portion of the automobile for movement of the traction elements around the axis of the wheel, means for detachably securing the other end of the elements to a fixed portion of the automobile in an inoperative position of the device in which the elements are spaced from the wheel, and for detachably securing said other end of the elements to the wheel on the side opposite the first end in an operative position of the device in which a mid-portion of the elements are in friction engagement with the tread surface of the wheel.

2. A traction device comprising traction elements for frictionally bearing on the tread surface of a traction wheel of an automobile, means mounted on a stationary portion of the automobile for rotation relative thereto about the axis of the wheel, one end of the traction elements being permanently secured to said means, means for detachably securing the other end of the elements to a stationary portion of the automobile in an inoperative position of the device, and for detachably securing said other end to the wheel on the side opposite the first end in an operative position of the device with a mid-portion of the elements in friction engagement with the tread surface of the wheel.

3. A traction device comprising a stationary plate on one side of a wheel of an automobile, a ring mounted on said plate for rotation relative thereto, traction elements secured at one end to said ring, means for detachably securing the traction elements at the other end to the wheel on the side thereof opposite the plate in an operative position of the device with the mid-portion of the elements in engagement with the tread surface of the wheel, and for positively restraining rotation of the ring whereby to cause relative rotation between the wheel and ring on movement of the automobile in an inoperative position of the device in which the traction elements are detached from the wheel.

4. A traction device for a traction wheel of an automobile, comprising traction elements, means securing the traction elements at one end to a stationary portion of the automobile for movement of the traction elements about the axis of the wheel, the traction elements including a linear resilient segment, means for detachably securing the traction elements at the other end to a fixed portion of the automobile such as a fender in an inoperative position of the device in which the traction elements are out of engagement with the wheel, and for detachably securing the traction elements at said other end to the wheel on the side thereof opposite said one side in an operative position of the device in which the traction elements are in friction engagement with the wheel, said resilient element serving to retain the traction elements taut in either of said positions of detachable securement.

5. A traction device for a traction wheel of an automobile, the wheel having a tire bulbous in cross section and a body inset from the axially outer portion of the tire, the automobile having a rear bumper, said device comprising traction elements, means securing the traction elements at one end to a stationary portion of the automobile adjacent the inner side of the wheel at a point spaced axially toward the center plane of the wheel from the axial extremity of the tire and for movement of the traction elements about the axis of the wheel, means detachably securing the traction elements at the other end to the bumper in an inoperative position of the device at such point on the bumper as to retain the traction elements in position extending diagonally inwardly from the point of connection with the wheel and thereby clear the tire, and detachably securing the traction elements at said other end to the outer side of the wheel in an operative position of the device in which the traction elements are in friction engagement with the wheel.

6. A traction device comprising a pair of traction elements for frictionally bearing on the tread surface of a traction wheel of an automobile, means permanently securing the traction elements at one end to a stationary part of the automobile on a first side of the wheel at spaced apart points for movement of the traction elements relative to said stationary part about the axis of the wheel, means interconnecting the traction elements and spacing them apart, a hook piece connected to the traction elements at their other end and having an aperture therein, the wheel on the side opposite said first side having a projection, said hook piece being adapted to be hooked over said projection with the latter received in said aperture for detachably securing the traction elements in engagement with the tread surface of the wheel in an operative position of the device, and for detachably securing the traction elements to a fixed portion of the automobile in an inoperative position of the device in which the traction elements are out of engagement with the wheel.

7. A traction device comprising traction elements for frictionally engaging a traction wheel of an automobile having a bumper, means securing the traction elements at one end to a stationary part of the automobile at one side of the wheel for relative rotation between the traction elements and said stationary part, hook means for detachably securing the traction elements at the other end to the other side of the wheel in an operative position of the device with the mid-portion of the traction elements engaging the tread surface of the wheel, the bumper being spaced a substantially greater distance from the wheel than the length of the traction elements thus far stated, and a resilient element longitudinally beyond and connected to said hook means for detachably securing the traction elements at said other end to the bumper in an inoperative position of the device in which the traction elements are out of engagement with the wheel, and for detachably securing the free end of the resilient element to the traction elements at a point longitudinally spaced from the hook means toward the first end of the traction elements.

8. A traction device for a traction wheel of a vehicle having a stationary plate with a peripheral flange, comprising an annular bearing including an inner race secured to said flange and an outer race, a ring secured to the outer race and extending radially inwardly to cover the inner race, linear traction elements secured at one end to said ring, means detachably securing the traction elements at the other end to the wheel on the side opposite said plate in an operative position of the device with the mid-portion of the traction elements engaging the tread surface of the wheel, and for detachably securing the traction elements at said other end to a stationary portion of the vehicle in an inoperative position in which the traction elements are out of engagement with the wheel.

9. A traction device for a traction wheel of a vehicle, comprising a central plate secured to a stationary part of the vehicle at one side of the wheel, an annular bearing having an inner race secured to the periphery of the plate and an outer race, a ring secured to the outer race and extending radially inwardly to cover the inner race, linear traction elements secured at one end to said ring, means detachably securing the traction elements at the other end to the wheel on the side opposite said plate in an operative position of the device with the mid-portion of the traction elements engaging the tread surface of the wheel, and for detachably securing the traction elements at said other end to a stationary portion of the vehicle in an inoperative position of the device in which the traction elements are out of engagement with the wheel.

References Cited in the file of this patent

UNITED STATES PATENTS

| | | |
|---|---|---|
| 2,195,982 | Daley | Apr. 2, 1940 |
| 2,720,237 | Chamberlain | Oct. 11, 1955 |
| 2,746,507 | Morgan | May 22, 1956 |